(12) United States Patent
Wilke et al.

(10) Patent No.: US 11,187,121 B2
(45) Date of Patent: Nov. 30, 2021

(54) METHOD AND CONTROL UNIT FOR OPERATING A DIESEL INTERNAL COMBUSTION ENGINE OR A DUAL-FUEL INTERNAL COMBUSTION ENGINE OPERATED IN THE DIESEL MODE

(71) Applicant: MAN Energy Solutions SE, Augsburg (DE)

(72) Inventors: Ingo Wilke, Tutzing (DE); Andreas Beck, Mertingen (DE); Jens Lange, Friedberg (DE); Christoph Rohbogner, Augsburg (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 16/850,329

(22) Filed: Apr. 16, 2020

(65) Prior Publication Data

US 2020/0340378 A1    Oct. 29, 2020

(30) Foreign Application Priority Data

Apr. 29, 2019  (DE) ..................... 10 2019 111 030.0

(51) Int. Cl.
*F01M 11/04*    (2006.01)
*F01M 11/10*    (2006.01)
*F02D 19/06*    (2006.01)

(52) U.S. Cl.
CPC ......... *F01M 11/0458* (2013.01); *F01M 11/10* (2013.01); *F02D 19/06* (2013.01); *F01M 2011/1493* (2013.01); *F01M 2250/00* (2013.01)

(58) Field of Classification Search
CPC ............... F01M 11/0458; F01M 11/10; F01M 2011/1493; F01M 2250/00; F01M 2011/0466; F01M 2011/0475; F02D 19/06; F16N 2250/36; F16N 31/00; F16N 2210/06; F16N 2270/52; F16N 2270/54; F16N 2200/08; F16N 2200/12
See application file for complete search history.

(56) References Cited

U.S. PATENT DOCUMENTS

2009/0139484 A1* 6/2009 Harris .................... F01M 11/12
                                                123/196 S

FOREIGN PATENT DOCUMENTS

DE        102016211250      12/2016

* cited by examiner

*Primary Examiner* — Jacob M Amick
*Assistant Examiner* — Charles J Brauch
(74) *Attorney, Agent, or Firm* — Cozen O'Connor

(57) ABSTRACT

A method for operating an internal combustion engine wherein the internal combustion engine to be operated is supplied with lubricating oil via an oil circuit. A measurement value of a total base number and/or a measurement value of the viscosity of the lubricating oil currently used in the oil circuit for the lubrication is detected. Dependent on the established measurement value of the total base number and/or dependent on the established measurement value of the viscosity an exchange oil quantity for the oil circuit is determined. Currently used lubricating oil to an extent corresponding to the exchange oil quantity is removed from the oil circuit. New lubricating oil to an extent corresponding to the exchange oil quantity is supplied to the oil circuit.

6 Claims, 1 Drawing Sheet

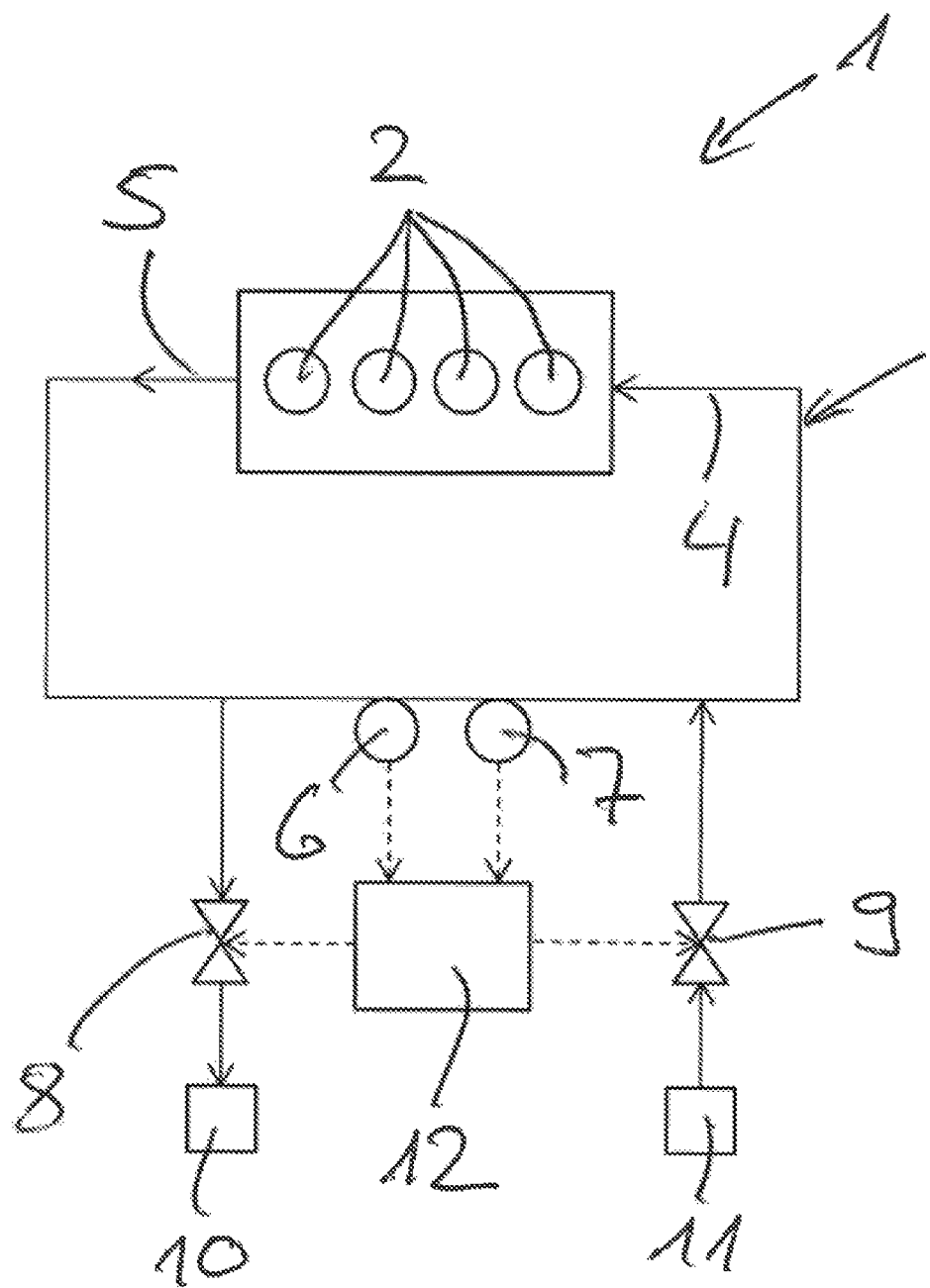

METHOD AND CONTROL UNIT FOR OPERATING A DIESEL INTERNAL COMBUSTION ENGINE OR A DUAL-FUEL INTERNAL COMBUSTION ENGINE OPERATED IN THE DIESEL MODE

BACKGROUND OF INVENTION

1. Field of the Invention

The invention relates to a method for operating a diesel internal combustion engine or a dual-fuel internal combustion engine operated in the diesel mode. The invention, furthermore, relates to a control unit for operating a diesel internal combustion engine or a dual-fuel internal combustion engine operated in the diesel mode.

The invention further relates in particular to the range of so-called large engines or large internal combustion engines whose cylinders have piston diameters of more than 140 mm, in particular of more than 175 mm. Such large internal combustion engines are for example ship engines.

2. Description of Related Art

Internal combustion engines have to be lubricated with lubricating oil during the operation. In the process, the lubricating oil is subject to an operation-related ageing. The ageing of the lubricating oil can result in that the lubricating oil loses the lubricating effect and damage of the internal combustion engine occurs. This has to be avoided.

In the sector of so-called large engines it is usual that a part of the lubricating oil enters the combustion chambers of the cylinders where it is combusted together with the fuel to be combusted. This operation-related lubricating oil consumption is compensated in that the lubricating oil circuit is supplied with fresh lubricating oil from time to time, namely in particular when too much lubricating oil has been combusted in the region of the cylinders.

Through the consumption or the combustion of the lubricating oil in the region of the cylinders and the replenishing of new lubricating oil for offsetting this oil consumption an adequate lubricating effect of the lubricating oil is mostly maintained in conventional large internal combustion engines so that it is not necessary to perform a complete oil change on the internal combustion engine. This would involve major expenditure.

However, the combusting of the lubricating oil in the region of the cylinders results in high exhaust gas emissions. With ever more stringent emission regulations it has to be avoided that lubricating oil is combusted in the region of the cylinders. Replenishment of combusted lubricating oil carried out in conventional large internal combustion engines is reduced. It is therefore necessary in internal combustion engines in which as little as possible lubricating oil is combusted in the region of the cylinders for improving the exhaust gas emissions to perform a complete oil change in particular when the ageing of the lubricating oil has advanced too much. This is expensive.

SUMMARY OF THE INVENTION

There is therefore a need to be able to do without a complete oil change even in such newer-type internal combustion engines in which in the region of the cylinders lubricating oil is only combusted to a minor extent.

One aspect of the present invention is based on the object of creating a new type of method and control unit for operating a diesel internal combustion engine or a dual-fuel internal combustion engine operated in the diesel operating mode.

According to one aspect of the invention, a measurement value of the total base number or a measurement value of the viscosity of the lubricating oil currently used in the oil circuit for the lubrication is detected. Dependent on the measurement value of the total base number and/or dependent on the measurement value of the viscosity, an exchange oil quantity for the oil circuit is determined. Currently used lubricating oil to the extent of the determined exchange oil quantity is removed from the oil circuit. Furthermore, new lubricating oil is supplied to the oil circuit to a degree corresponding to the determined exchange oil quantity. With one aspect of the invention it is proposed for the first time to detect the total base number (TBN) and/or the viscosity of the lubricating oil used by measurement. Dependent on the respective detected measurement value, the exchange oil quantity for the internal combustion engine is determined. To the extent of the exchange oil quantity, lubricating oil is then specifically removed from the oil circuit, wherein new lubricating oil is supplied to the lubricating oil circuit to the same extent. By way of this, a lubricating oil consumption can then be reproduced without repercussions on exhaust gas emissions. The lubricating oil removed from the oil circuit is collected in a collection tank and can be subsequently disposed of or used further. Thus, a complete oil change can be omitted even in internal combustion engines in which due to the design little lubricating oil is combusted in the region of the cylinders.

According to a further development of the invention, the measurement value of the total base number and the measurement value of the viscosity of the lubricating oil currently used in the oil circuit for the lubrication is detected, wherein dependent on the determined measurement value of the total base number and dependent on the determined measurement value of the viscosity the exchange oil quantity for the oil circuit is determined. Establishing the exchange oil quantity dependent on both measurements value, i.e., dependent on both the total base number and also dependent on the viscosity of the lubricating oil is particularly preferred in order to advantageously determine the exchange oil quantity for a diesel internal combustion engine or a dual-fuel internal combustion engine operated in the diesel mode.

According to a further development of the invention, the exchange oil quantity for the oil circuit is determined dependent on the established measurement value of the total base number and/or dependent on the established measurement value of the viscosity as a function of the characteristic diagram or as a function of the characteristic curve. A determination of the exchange oil quantity as a function of the characteristic diagram or characteristic curve can be implemented particularly easily. For different support points of the measurement values of the total base number and/or of the viscosity, exchange oil quantities can be stored, wherein if required interpolation between individual measurement values can be carried out.

The control unit for operating a diesel internal combustion engine or a dual-fuel internal combustion engine operated in the diesel operating mode is defined in claim 6.

BRIEF DESCRIPTION OF THE DRAWINGS

Preferred further developments of the invention are obtained from the subclaims and the following description.

Exemplary embodiments of the invention are explained in more detail by way of the drawing without being restricted to this. There it shows:

The FIGURE is a diagram of an internal combustion engine.

DETAILED DESCRIPTION OF THE PRESENTLY PREFERRED EMBODIMENTS

The invention relates to a method and to a control unit for operating a diesel internal combustion engine or a dual-fuel internal combustion engine operated in the diesel operating mode.

The FIGURE shows a highly schematised diagram of an internal combustion engine 1, which comprises multiple cylinders 2 and an oil circuit 3. The oil circuit 3 serves for supplying in particular the cylinders 2 of the internal combustion engine 1 with lubricating oil, wherein the lubricating oil is supplied to the cylinders 2 of the internal combustion engine 1 via an advance 4 and discharged from the same via a return 5.

According to one aspect of the invention it is proposed to detect a measurement value of the total base number (TBN) and/or a measurement value of the viscosity of the lubricating oil currently used in the oil circuit 3 for the lubrication. The measurement value of the total base number of the lubricating oil currently used in the oil circuit 3 for the lubrication is detected with the help of a first sensor 6. The measurement value of the viscosity of the lubricating oil currently used in the oil circuit 3 for the lubrication is detected with the help of a second sensor 7.

The arrangement of the sensors 6 and 7 in the oil circuit is arbitrary. The two sensors 6 and 7 can also be combined into a unit.

Dependent on the established measurement value of the total base number and/or dependent on the established measurement value of the viscosity, an exchange oil quantity for the oil circuit 3 is determined. To this end, the two sensors 6, 7 transmit their respective measurement value to a control unit 12, which dependent on the measurement value of the total base number and/or dependent on the measurement value of the viscosity determines the exchange oil quantity for the oil circuit 3.

According to one aspect of the invention, currently used lubricating oil is removed from the oil circuit 3 to an extent corresponding to the determined exchange oil quantity, furthermore, new lubricating oil to an extent corresponding to the determined exchange oil quantity is supplied to the oil circuit 3. The control unit 12 determines control variables as a function of which this oil exchange is carried out.

Accordingly, the FIGURE shows a first valve 8 which can be directly or indirectly controlled by the control unit 12 subject to the intermediate connection of a further control unit, in order to remove lubricating oil to the extent corresponding to the determined exchange oil quantity from the oil circuit 3 and collect the same in a collection tank 10. Furthermore, the FIGURE shows a further valve 9 which can be likewise controlled emanating from the control unit 12 in order to supply the oil circuit 3 with new lubricating oil which is kept ready in a storage tank 11.

With the invention it is proposed accordingly to remove a defined oil quantity from the oil circuit 3 dependent on the measurement value of the total base number and/or dependent on the measurement value of the viscosity of the lubricating oil currently used in the oil circuit 3 for the lubrication and exchange the same against new lubricating oil, namely to the extent of the exchange oil quantity established as a function of the respective measurement value.

In this way, an oil consumption can be reproduced in the region of the cylinders 2. A defined exchange oil quantity of new oil can be continuously supplied in order to maintain the lubricating oil characteristics of the lubricating oil and render a complete oil change on the internal combustion engine 1 superfluous.

The determination of the exchange oil quantity for the oil circuit dependent on the established measurement value of the total base number and/or dependent on the established measurement value of the viscosity takes place preferentially dependent on the characteristic diagram or characteristic curve. The characteristic map or the characteristic curve is stored in the control unit 12. For different support points of measurement values, exchange oil quantities are stored. Interpolation or extrapolation can be performed between individual support points.

The method is employed with diesel internal combustion engines or dual-fuel internal combustion engines operated in the diesel operating mode. In particular, the exchange oil quantity is determined dependent on the two measurement values, i.e. dependent both on the total based number and also dependent on the viscosity of the lubricating oil. This procedure is particularly preferred for diesel internal combustion engines or dual-fuel engines operated in the diesel operating mode.

One aspect of the invention, furthermore, relates to a control unit 12 for carrying out the method. The control unit is equipped to carry out the method described above on the control side. To this end, the control unit 12 comprises data interfaces in order to exchange data with the assemblies involved in carrying out the method according to the invention, in particular with the sensors 6 and 7 and the valves 8 and 9. Furthermore, the control unit 12 as assembly on the hardware side comprises a processor for the data processing and a memory for data storage. Furthermore, the control unit 12 comprises means on the software side which are program modules which serve for carrying out the method according to the invention.

The control unit 12 receives from the respective sensors 6, 7 the respective measurement value, preferentially the measurement value of the total base number from the sensor 6 and the measurement value of the viscosity from the sensor 7. Dependent on the respective measurement value, the control unit 12 determines the exchange oil quantity. Dependent on the exchange oil quantity, the control unit 12 emits control signals, as a function of which the oil exchange takes place, as a function of which accordingly currently used lubricating oil is removed from the oil circuit 3 and new lubricating oil supplied to the oil circuit 3.

The invention relates in particular to the sector of so-called large engines or large internal combustion engines whose cylinders have piston diameters of more than 140 mm, in particular of more than 175 mm. Such large internal combustion engines are for example marine engines. In the invention, these are embodied as diesel internal combustion engines or as dual-fuel internal combustion engines operated in the diesel operating mode. As fuel, such internal combustion engines combust gaseous fuel such as natural gas or liquid fuel such as methanol. Internal combustion engines combusting gaseous fuel are also referred to as gas engines.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a diesel internal combustion engine or a dual-fuel internal combustion engine operated in a diesel operating mode, comprising:
   supplying the internal combustion engine with lubricating oil via an oil circuit;
   detecting a measurement value of a total base number and/or a measurement value of a viscosity of the lubricating oil currently used in the oil circuit for lubrication;
   determining an exchange oil quantity for the oil circuit based at least in part on:
     the measurement value of the total base number and/or the measurement value of the viscosity;
   controlling a first valve to remove currently used lubricating oil to an extent corresponding to the exchange oil quantity directly from the oil circuit into a collection tank; and
   controlling a second valve to add new lubricating oil to the extent corresponding to the exchange oil quantity directly to the oil circuit from an oil storage tank.

2. The method according to claim 1, further comprising:
   determining based at least in part on the measurement value of the total base number and the measurement value of the viscosity the exchange oil quantity for the oil circuit.

3. The method according to claim 1, wherein the measurement value of the total base number of the lubricating oil currently used in the oil circuit for the lubrication is detected with a first sensor.

4. The method according to claim 3, wherein the measurement value of the viscosity of the lubricating oil currently used in the oil circuit for the lubrication is detected with a second sensor.

5. The method according to claim 1, wherein the exchange oil quantity for the oil circuit is determined based at least in part on the measurement value of the total base number and/or the measurement value of the viscosity as a function of a characteristic map or characteristic curve.

6. A control unit configured to operate a diesel internal combustion engine or a dual-fuel internal combustion engine operated in a diesel operating mode, wherein the control unit is configured to:
   receive, from a sensor, a measurement value of a total base number and/or receive from a sensor a measurement value of a viscosity of lubricating oil currently used for lubricating the internal combustion engine in an oil circuit;
   determine an exchange oil quantity based at least in part on the measurement value of the total base number and/or the measurement value of the viscosity;
   emit a control signal, as a function of which, a first valve is opened and currently used lubricating oil is removed directly into a collection tank from the oil circuit to an extent corresponding to the determined exchange oil quantity; and
   emit a control signal as a function of which a first valve is opened and new lubricating oil to an extent corresponding to the determined exchange oil quantity is suppliable to the oil circuit directly from an oil storage tank.

* * * * *